March 24, 1936.  D. E. FELTMAN  2,035,058
PLANTER
Filed May 14, 1935  4 Sheets-Sheet 2
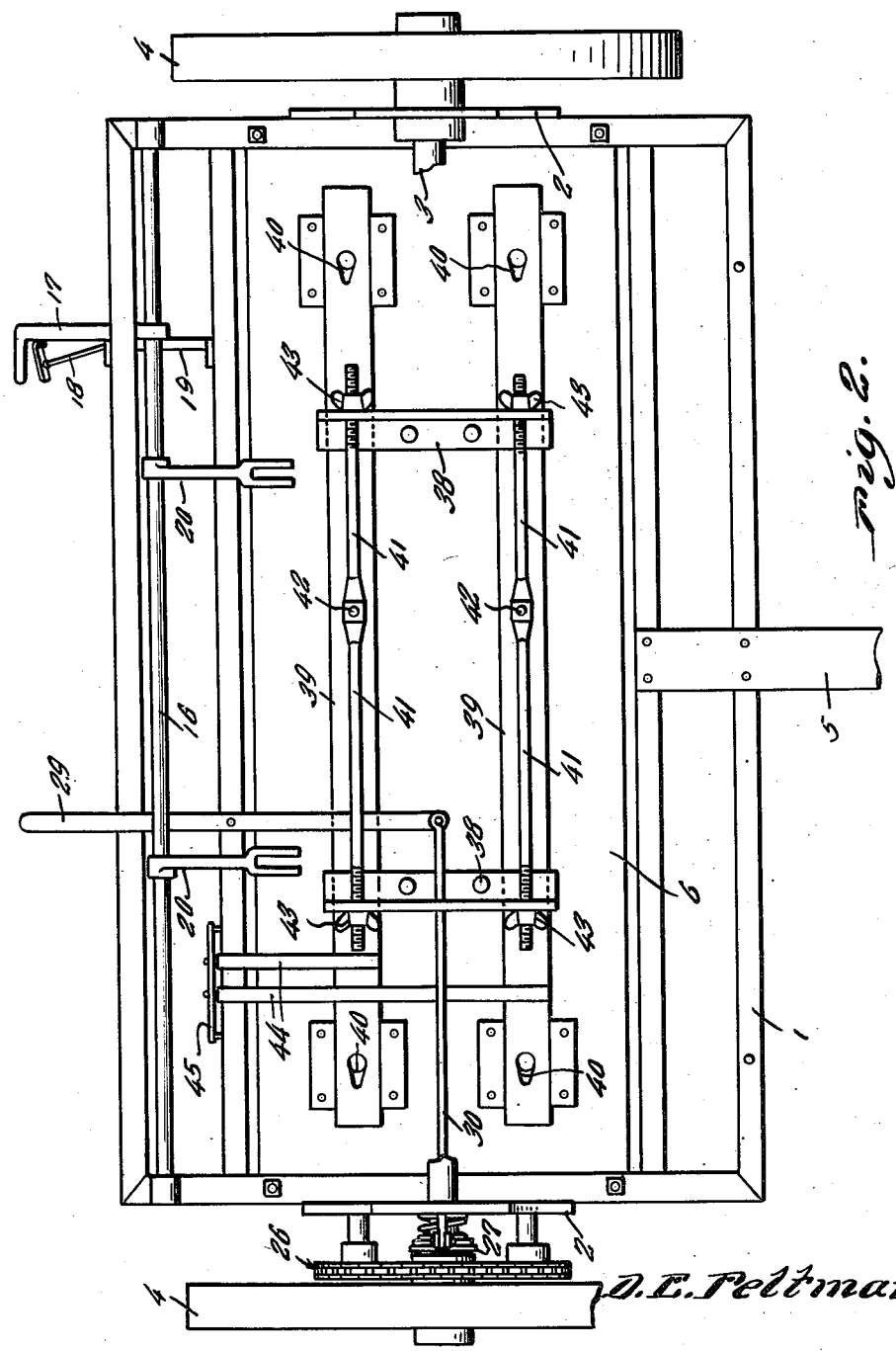
Inventor
D. E. Feltman
By Clarence A. O'Brien
Attorney

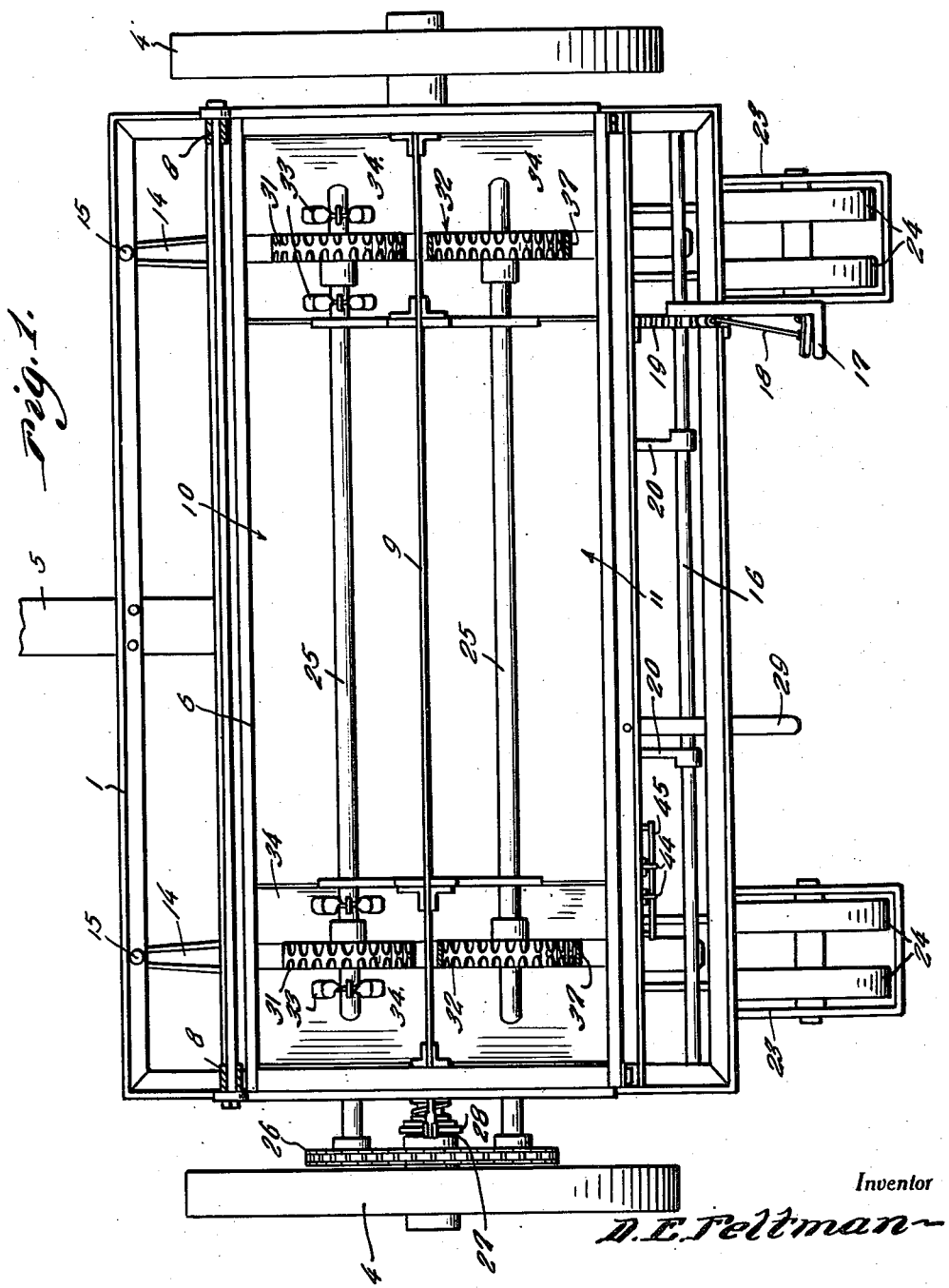

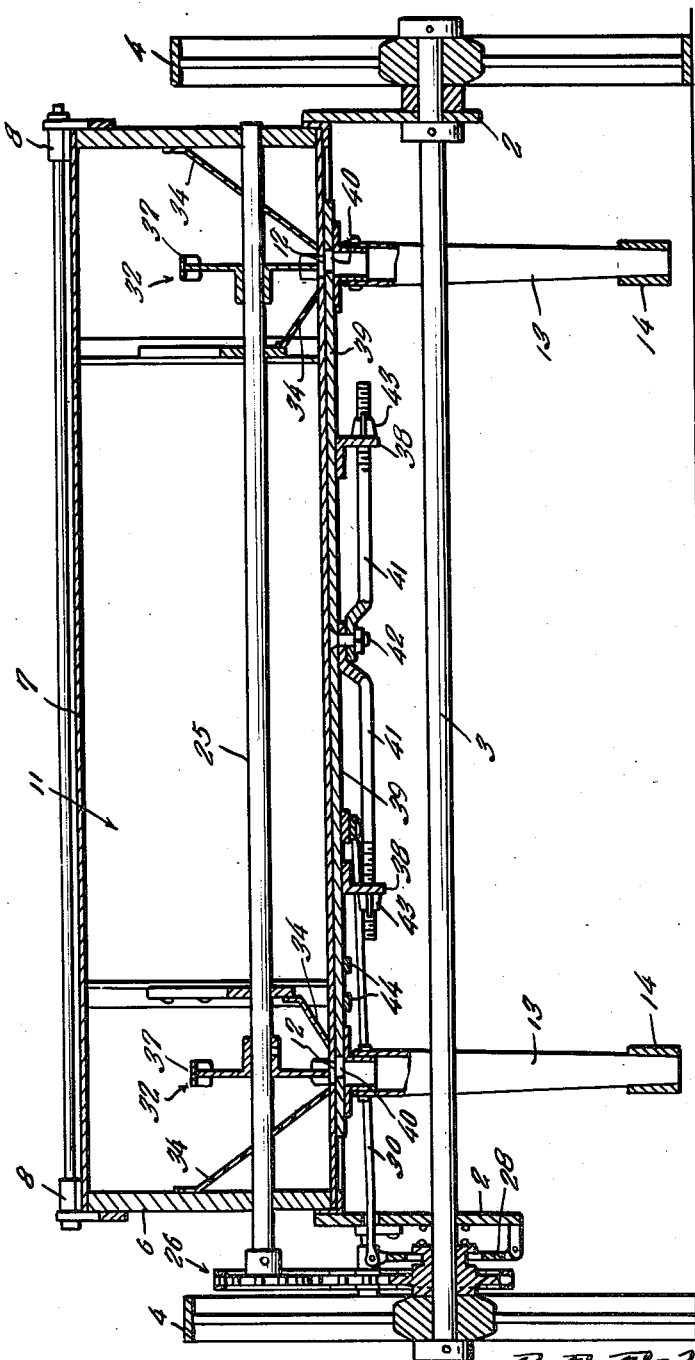

March 24, 1936.    D. E. FELTMAN    2,035,058
PLANTER
Filed May 14, 1935    4 Sheets-Sheet 4
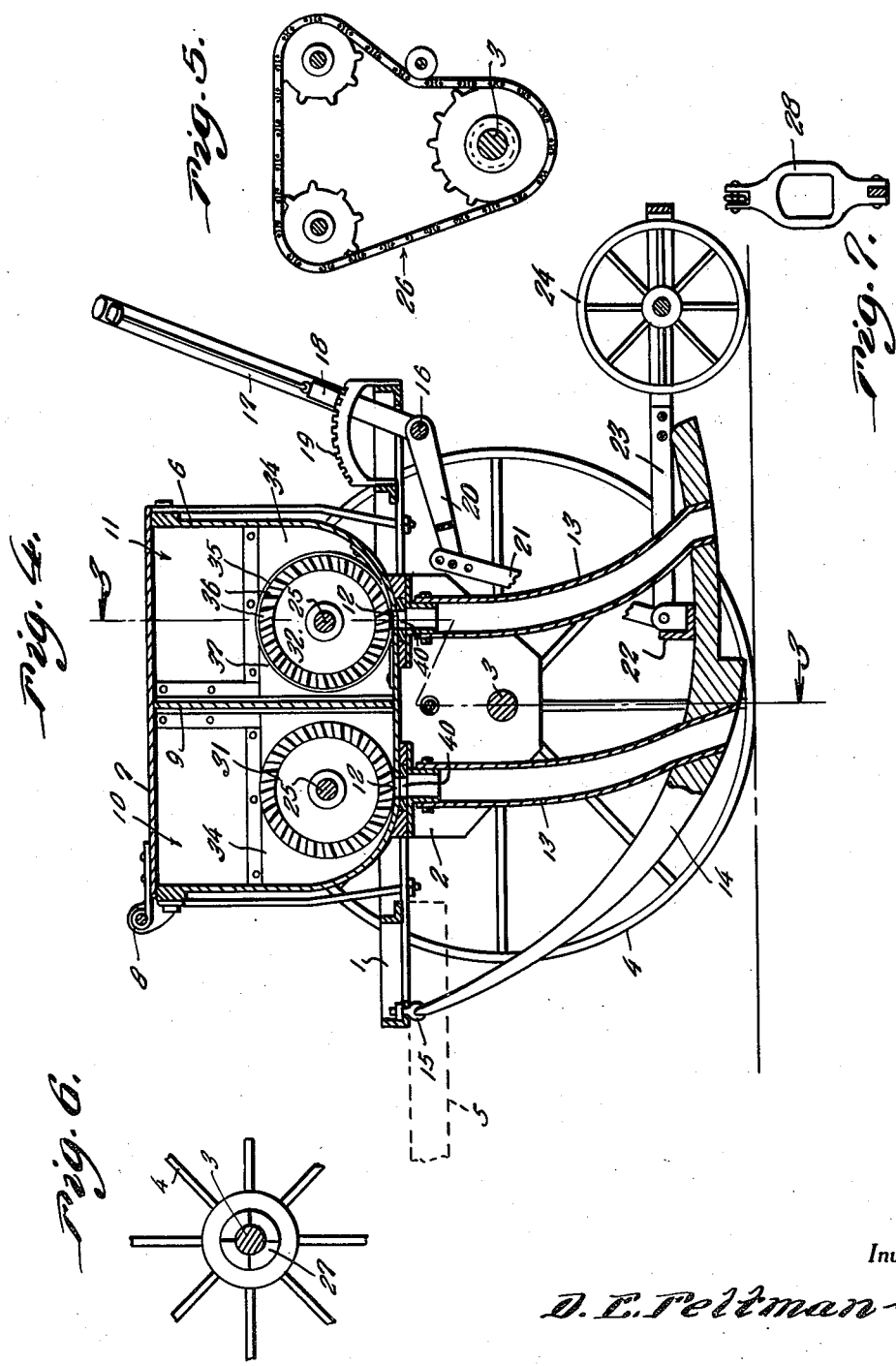
Inventor
D. E. Feltman
By Clarence A. O'Brien
Attorney Patented Mar. 24, 1936

2,035,058

UNITED STATES PATENT OFFICE 2,035,058

PLANTER

David E. Feltman, Ottawa, Ohio

Application May 14, 1935, Serial No. 21,445

2 Claims. (Cl. 221—145)

The present invention relates to new and useful improvements in planters and has for its primary object to provide, in a manner as hereinafter set forth, a machine of this character which is adapted to deposit both seed and fertilizer.

Another important object of the invention is to provide a planter of the aforementioned character embodying a novel construction, combination and arrangement of parts through the medium of which the fertilizer will be deposited first and covered, and the seed then deposited thereover.

Still another very important object of the invention is to provide a planting machine of the character described which includes novel means for regulating the discharge of seed and fertilizer.

Other objects of the invention are to provide a planter of the character set forth which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in top plan of a planter constructed in accordance with the present invention, the bands encircling the seed discharging wheels being shown in horizontal section.

Figure 2 is a view in bottom plan of the device with parts omitted.

Figure 3 is a view in vertical transverse section through the machine, taken substantially on the line 3—3 of Figure 4.

Figure 4 is a view in irregular longitudinal section through the invention.

Figure 5 is a view in vertical section through a side portion of the machine, showing the drive mechanism for the seed and fertilizer depositing apparatus.

Figure 6 is a detail view in side elevation of the portion of the clutch which is on one of the supporting wheels.

Figure 7 is a detail view in side elevation of the clutch operating yoke.

Referring now to the drawings in detail, it will be seen that the embodiment of the invention which has been illustrated comprises a metallic frame 1 from the sides of which plates 2 depend. Extending through the plates 2 is an axle 3 on the end portions of which supporting wheels 4 are journaled. A suitable tongue 5 is secured to the frame 1.

Mounted on the frame 1 is a hopper 6 of suitable material, preferably metal, which is provided with a closure 7, said closure being hinged, as at 8. Extending transversely in the hopper 6 is a vertical partition 9 which divides said hopper into fertilizer and seed compartments 10 and 11, respectively.

The compartments 10 and 11 are provided, in their bottoms, with discharge openings 12 with which flexible depositing tubes 13 communicate. The lower end portions of the flexible tubes 13 are anchored in openings which are provided therefor in compound shoes 14 which are connected, at their forward ends, for swinging movement in a vertical plane on the frame 1, as at 15. The shoes 14 are constructed to cover the fertilizer after said fertilizer is deposited, thus causing the seed to be deposited on the dirt with which the fertilizer has been covered.

A transverse shaft 16 is journaled in suitable bearings provided therefor beneath a rear portion of the frame 1 and fixed on said shaft is a hand lever 17 which is provided with a latch 18, said latch being engageable with a notched quadrant 19 for releasably securing said lever in adjusted position. Also fixed on the shaft 16 is a pair of arms 20 having adjustably connected thereto links 21. The links 21 connect the arms 20 to a bar 22 which extends between the shoes 14. It will thus be seen that means has been provided through the medium of which the shoes 14 may be conveniently adjusted to deposit the fertilizer and seed at any desired depth. Frames 23 are pivotally connected to the bar 22 and extend rearwardly therefrom. Packer wheels 24 are journaled in the frames 23 behind the shoes 14.

Transverse shafts 25 are rotatably mounted in the compartments 10 and 11 of the hopper 6, said shafts being driven by one of the wheels 4 through a clutch controlled chain and sprocket connection which is designated generally by the reference numeral 26. Operatively connected to the clutch 27 which constitutes a part of the drive 26 is a pivoted yoke 28. Pivotally mounted, at an intermediate point, beneath the frame 1 is a hand lever 29 which is connected by a rod 30 to the free end of the yoke 28. The lever 29 provides means for conveniently disengaging the clutch 27.

Fixed on the shafts 25 in the compartments 10 and 11 of the hopper 6 are fertilizer and seed depositing wheels 31 and 32, respectively. The shaft 25 in the fertilizer compartment 10 also has fixed thereon, on opposite sides of the wheels 31, agitators 33. Inclined plates 34 direct the fertilizer and seed toward the discharge openings 12. The seed wheels 32 have formed integrally therewith thick or heavy peripheral flanges 35 having tangential notches 36 therein constituting pockets for the reception of the seed. Bands 37 encircle the seed wheels 32 for preventing the seed from entering the pockets 36 at the outer ends thereof. If desired, the flanges 35 on one side of the seed wheels 32 may be solid or, in other words, without the pockets 36. The fertilizer wheels 31 are substantially similar to the seed wheels 32 with the exception that the bands 37 are omitted.

Angle iron bars 38 are mounted beneath the body 6 in spaced relation thereto and slidably mounted between said bars 38 and the body 6 are elongated plates 39 which extend beneath the discharge openings 12 and are provided with tapered slots 40 communicating therewith. Threaded rods 41 are pivotally connected, as at 42, to the plates 39 and extend slidably through the angle iron bars 38 and have threaded thereon adjusting nuts 43. It should perhaps be here stated that the plates 39 are mounted for sliding adjustment between the angle iron bars 38 and the hopper 6. Through the medium of the wing nuts 43 the plates 39 may be adjusted laterally as desired to regulate the discharge of the fertilizer and seed through the openings 12 by bringing the narrow or comparatively wide portions of the slots 40 into registry with said openings 12. Indicators 44 are fixed on the plates 39 and coact with a scale 45 on the frame 1 to facilitate adjusting said plates 39 to the desired position.

It is believed that the operation of the machine will be readily apparent from a consideration of the foregoing. As the planter is drawn forwardly over the ground with the clutch 27 in its normally engaged position, the wheels 31 and 32 will be actuated to cause the discharge of the fertilizer and seed through the openings 12. The fertilizer and seed fall by gravity through the flexible tubes 13 into the furrow, the fertilizer being deposited first and covered, after which the seed is deposited, as previously set forth. It may be well to here state that the shoes 14 are also constructed to cover the seed which is deposited. The packing wheels 24 then complete the operation. Through the medium of the lever 17, the depth at which the machine operates in the ground may be controlled as desired. Through the medium of the lever 29 the discharge of the fertilizer and seed may be regulated as desired by observing the gauge or scale 45. While a two row machine has been illustrated, a machine for planting any desired number of rows may be provided.

It is believed that the many advantages of a planter constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

1. A planter comprising a hopper having discharge openings therein, and means for controlling said discharge openings, said means including opposed bars mounted beneath the hopper in spaced relation thereto, an elongated plate slidably mounted between the bars and the hopper, said plate having tapered slots therein communicating with the discharge openings, threaded rods pivotally connected, at one end, to the plate, said rods extending slidably through the bars, and adjusting nuts threadedly mounted on the rods and engageable with the bars for shifting the plate.

2. A planter comprising an elongated hopper including a bottom having spaced discharge openings therein, a pair of spaced, opposed angle iron bars mounted on said bottom in spaced relation thereto between the discharge openings, an elongated plate slidably mounted between the bars and the bottom, said plate having substantially tapered slots therein communicating with the discharge openings, rods connected, at one end, by a common pivot to an intermediate portion of the plate, said rods extending in opposite directions from the common pivot and projecting slidably through the bars, and nuts threaded on said rods and engageable with the bars for shifting the plate in opposite directions for controlling the discharge openings.

DAVID E. FELTMAN.